No. 800,061. PATENTED SEPT. 19, 1905.
J. M. BLUE.
HAY ELEVATOR AND STACKER.
APPLICATION FILED FEB. 23, 1905.
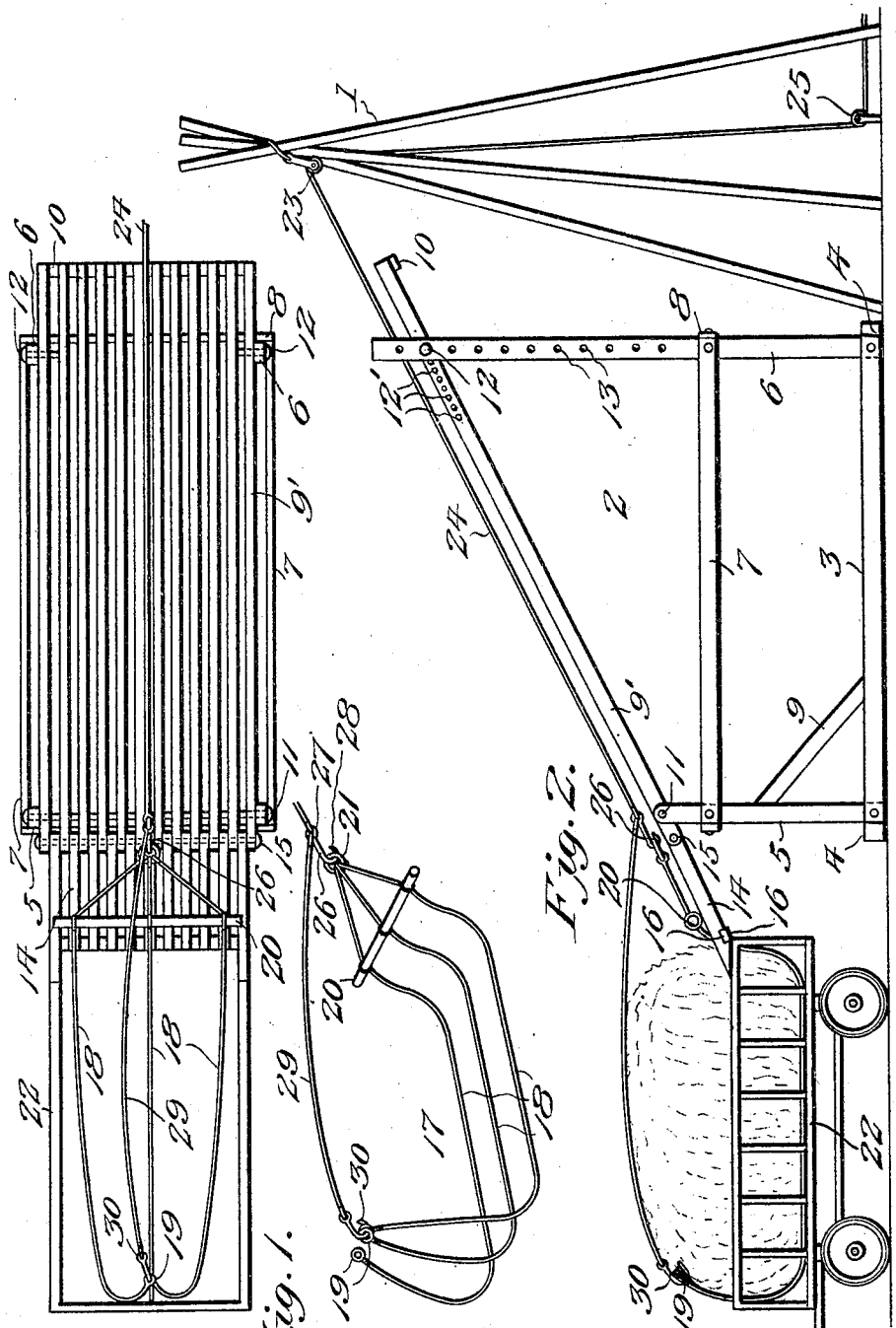
Witnesses
Edwin F. McKee
C. C. Hines
Inventor
John M. Blue
By Victor J. Evans
Attorney

UNITED STATES PATENT OFFICE.

JOHN M. BLUE, OF AVA, ILLINOIS.

HAY ELEVATOR AND STACKER.

No. 800,061.    Specification of Letters Patent.    Patented Sept. 19, 1905.

Application filed February 23, 1905. Serial No. 246,996.

*To all whom it may concern:*

Be it known that I, JOHN M. BLUE, a citizen of the United States, residing at Ava, in the county of Jackson and State of Illinois, have invented new and useful Improvements in Hay Elevators and Stackers, of which the following is a specification.

This invention relates to certain new and useful improvements in hay elevators and stackers, the object in view being to provide a simple, convenient, and efficient apparatus of this character by which the operation of unloading hay from wagons or racks and elevating the same to the storage part of a barn or to a suitable elevation for building a stack or mow may be readily performed.

Another object is to provide means for adjusting the parts of the apparatus to suit different heights of wagons or racks and to lift the hay to different elevations.

With these and other objects in view the invention consists of the features of construction, combination, and arrangement of parts hereinafter fully described, reference being had to the accompanying drawings, in which—

Figure 1 is a top plan view of a hay elevator and stacker embodying my invention. Fig. 2 is a side elevation of the same, showing the elevating means in position to unload and raise a load of hay from a wagon or rack; and Fig. 3 is a detail view of the sling and means for connecting the same to the draft-cable.

The numeral 1 in the drawings represents a derrick or supporting-frame, which may be of any preferred construction, and 2 is an elevating-frame comprising side and end sills 3 and 4 and front and rear pairs of standards 5 and 6, rising therefrom and which are tied and braced by connecting-bars or bracing-strips 7 and 8. The front standards 5 are comparatively short and may be reinforced from the side sills 3 by inclined struts 9, while the rear standards 6 rise to a considerable height and may be of any length desired to enable the platform hereinafter described to extend and the hay to be elevated to any elevation desired. Supported by the elevating-frame is an inclined platform 9', consisting of a series of longitudinal slats arranged in parallel relation and connected at their upper ends by a cross-piece 10. The lower and forward end of the slats are pivotally connected to the upper ends of the front standards 5 by a transverse pivot rod or bolt 11, so as to permit the rear end of the platform to be swung up and down to the desired elevation. The outer slats of the platform are adjustably connected near their upper rear ends to the rear standards 6 by fastening pins or bolts 12, which are adapted to engage openings 12' and 13, formed, respectively, in said platform and standards, whereby the said upper end of the platform may be secured at varying positions on said standard to regulate the height or elevation of the point of delivery of the hay.

The lower front ends of the slats 9' extend beyond the pivot rod or bolt 11 and receive the upper ends of slats composing a platform-section 14, which are pivoted to the said extended ends of the slats 9' by a cross rod or bolt 15. The outer ends of the slats of the section 14 are joined by a cross-piece 16. This construction of the section 14 provides for a vertical adjustment of the receiving ends of the slatted platform to adapt it to be rested upon and supported by the bodies of wagons or racks of different heights.

In conjunction with the platform hoisting means are provided, comprising a sling 17, consisting of a series of ropes or strands 18, each of which terminates at its outer end in a loop or eye 19. The inner ends of the ropes or strands are looped about or otherwise connected to a cross bar or rod 20, which holds them spread the desired distance apart, and from this bar or rod the ends project in convergent relation and are attached at their extremities to a connecting-ring 21. The sling is designed to be laid, as usual, in the body of a hay-transporting wagon or rack 22, with the connecting-ring 21 projecting from the rear and the loop ends 19 from the front of the body, so that when the body is filled with a load of hay or other material to be elevated the ropes 18 will rest under the load, as shown in Fig. 2.

Passing over a supporting-pulley 23, suitably mounted upon the upper end of the derrick 1, is a hoisting rope or cable 24, one portion of which passes downward from said pulley around a direction-pulley 25, mounted in the ground or a suitable support, and is thence continued rearwardly of said derrick and may be provided with a draft connection, (not shown,) whereby a draft-animal may be attached thereto for the purpose of elevating the load. The opposite portion of the chain or cable 24 is designed to extend downward over the platform 9' and is provided at its forward end with a coupling 26, having at one end an eye 27, to which the end of the cable 24 is attached, and at its other end a hook 28 to releasably engage the ring 21 of the sling. A rope 29 is also attached at one end to the eye 27 of the cable and is provided at its opposite or free end with a hook 30 to engage the loops or eyes 19 and hold the free ends of the sling-ropes 18 connected. This rope 29 performs the function of a connector to hold the sling looped or bound around the load, as well as to hold the load from displacement.

In operation the wagon or rack 22 is driven to a position adjacent the lower end of the elevating-frame 2 and backed until the rear end comes close to the standards 5, when the section 14 at the lower end of the platform is adjusted to rest upon the rear portion of the body of the wagon or rack. The lower end of the draft-cable 24 is then drawn into position and the hook 28 connected with the eye 21 and the hook 30 with the eyes or loops 19. Power is then applied to the rear end of the cable to cause the same to travel rearwardly, whereby the sling 17 will be drawn with its load out of the wagon-rack and onto the lower portion of the slatted platform 9'. In the first part of this movement the sling and load will proceed by a rolling motion up the platform-section 14 and upon the lower end of the main portion of the platform 9', thus enabling the load to be easily and conveniently withdrawn from the wagon or rack, and thence under the continued movement of the cable 24 the load will be drawn by a sliding movement up the platform 9' until it reaches the upper or delivery end thereof, when the hook 30 of the connecting-rope 29 may be disengaged from the eyes 19 to release the load if it be desired to dump the same to form a mow or stack or the sling drawn with its load through the door or opening in the storage portion of a barn and the connecting-rope disengaged to release the load to enable it to be distributed to the points desired. By connecting the upper end of the platform 9' to the standards 6 by means of the bolts 12 and their receiving-openings 12' and 13 the delivery end of the platform may be raised or lowered and supported in any desired elevation to bring the same opposite the doors at various heights in barns or storage structures or to enable the hay to be delivered to form a stack or mow of any height desired.

From the foregoing description, taken in connection with the accompanying drawings, the construction and mode of operation of the invention will be understood without a further extended description.

Changes in the form, proportions, and minor details of construction may be made within the scope of the invention without departing from the spirit or sacrificing any of the advantages thereof.

Having thus described the invention, what is claimed as new is—

In an elevating apparatus, the combination of an elevating-frame provided with front and rear supporting-standards, the rear standards extending above the front standards and provided with receiving-openings, a slatted platform arranged between said standards, a pivot-bolt joining the slats and pivotally connecting said platform near its lower end to the front standards, bolts for adjustably connecting the upper end of the platform with the rear standards, said bolts being adapted to engage the receiving-openings in said standards, a slatted receiving-section having its slats pivoted to the said pivot-bolt between the lower ends of the slats of the platform, and means for hoisting a load up said platform.

In testimony whereof I affix my signature in presence of two witnesses.

JOHN M. BLUE.

Witnesses:
R. E. MURRY,
J. F. YOUNGMAN.